Oct. 8, 1935.  O. WITTENBERG ET AL  2,016,734
INTERNAL COMBUSTION MOTOR
Filed March 12, 1931  2 Sheets-Sheet 2

Patented Oct. 8, 1935

2,016,734

UNITED STATES PATENT OFFICE 2,016,734

INTERNAL COMBUSTION MOTOR

Otto Wittenberg and Eugene Harsanyi, Budapest, Hungary

Application March 12, 1931, Serial No. 522,104
In Hungary March 26, 1930

1 Claim. (Cl. 123—191)

This invention relates to internal combustion motors with valves located in the cylinder head. The improvement consists in arranging the inlet and exhaust valves under different angles, the preferred construction being to arrange the stem of the one, preferably of the inlet valve, under an acute angle and the stem of the other valve, under a right angle to the axis of the cylinder bore. In consequence the compression chamber is a cylindrical extension of the cylinder bore, having a flat bottom oblique to the axis of the cylinder, while the one valve, preferably the admission valve, is located in the bottom, and the other valve in the cylindrical surface of the compression chamber. The plane of the cylinder bottom connects preferably the point of the valve seat in the mantle surface most remote from the inner end of the piston stroke with the diametrically opposite point of the inner end of the piston stroke. The cylinder head is preferably divided in the plane of the cylinder bottom.

The drawings show three modifications of an example of the embodiment of the invention.

Figure 1:
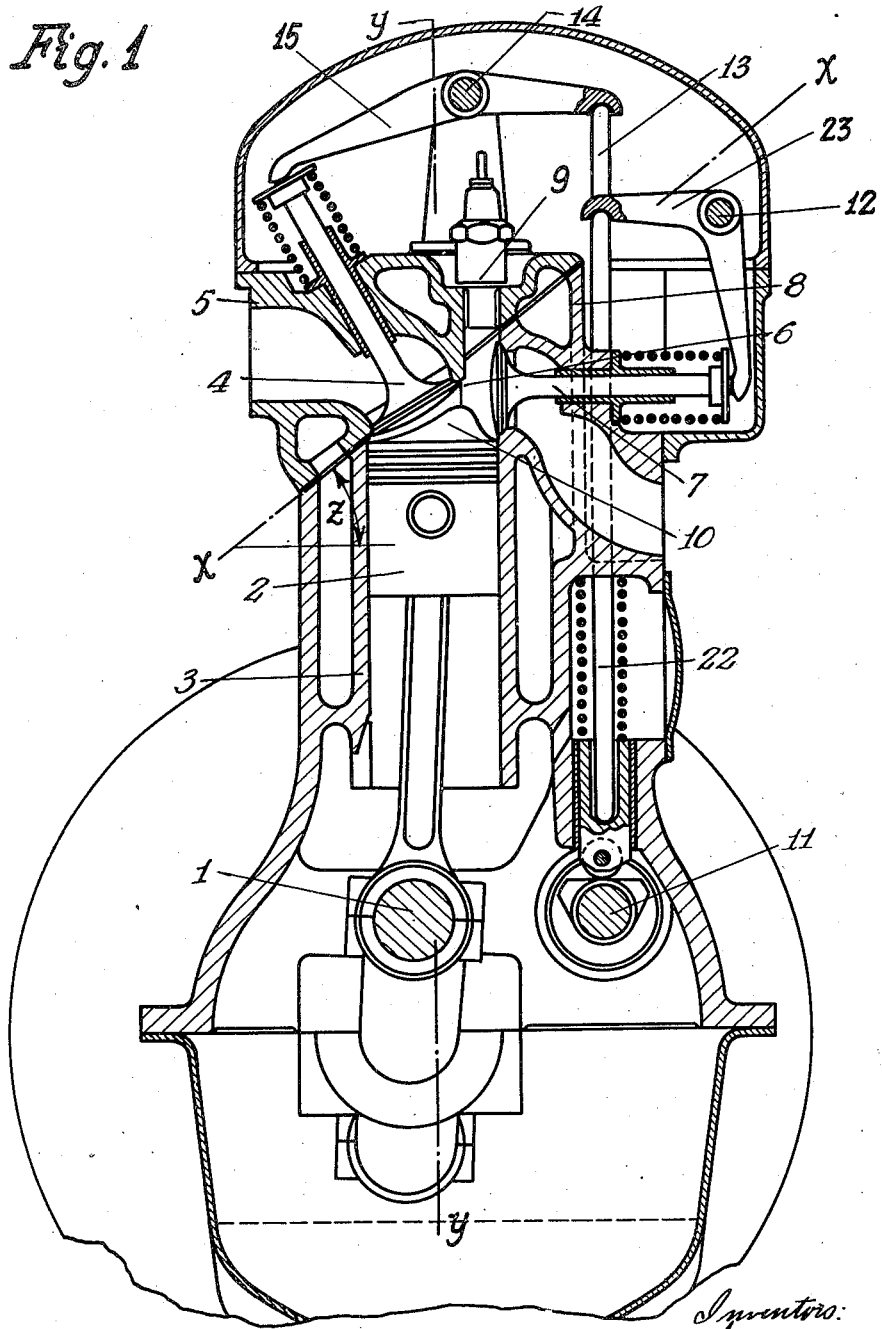
Fig. 1 is a sectional elevation of a motor according to the invention with a lower cam shaft common to the inlet and exhaust valves.

I is the crank shaft of the motor, 2 is the piston and 3 is the cylinder. The compression chamber is a cylindrical extension of the bore of the cylinder 3, with the same diameter and cut according to an oblique plane $x$—$x$ forming an acute angle $z$ with the axis $y$—$y$ of the cylinder 3. The angle $z$ is preferably smaller than 45°, but larger than 30°, most suitably 40°. The cylinder head is preferably divided along the plane $x$—$x$, so that the inner surface of the cylinder cover, that is to say, the cylinder bottom is plane, to allow an easy finishing of the cover as well as of the cylinder bore.

In motors with a plurality of cylinders the plane of division $x$—$x$ is parallel with the crank shaft so that all the cylinders may be divided according to a common plane. One of the valves, preferably the inlet valve 4, is located in the cover 5 in such a manner that the seat 6 of the valve 4 is level with the cylinder bottom. Of course, it must not be exactly level, as for example, even in Fig. 1 only the point of the seat 6 adjacent to the wall of the cylinder 3 is exactly level with the cylinder bottom, while towards the axis of the cylinder the valve seat extrudes slightly under a very acute angle from the cylinder bottom. The other valve 7, which is preferably the exhaust valve, is located in the mantle surface of the cylinder head forming the extension of the cylinder bore. Hence, the cylinder bottom extends from the point of the valve 7 most remote from the inner stroke end of the cylinder to a diametrically opposite point of this latter. The sparking plug is arranged in the cylinder cover between the two valves, so that it is situated substantially at the one end of the great axis of the elliptical cylinder bottom. In the case of two sparking plugs, they are arranged between the valves at either side of the line connecting the centers of the valves that is to say of the great axis of the elliptical cylinder bottom.

The cylinder head according to this invention allows the use of valves, especially of an inlet valve, of substantially larger diameter relatively to the cylinder bore, than has been possible hitherto. Different advantages result therefrom. For example the volumetric efficiency is increased, the mean torque of the motor at low and middle speeds is higher, owing to the smaller retardation of closing of the inlet valve. The speed and the gear ratio can be increased under same conditions by about 20–25% against the known constructions. The cylinder bottom, which stands under an acute angle to the exhaust valve, directs the exhaust gases towards the exhaust valve, so that the exhaust takes place with smaller frictional losses. The shape of the compression chamber causes a good turbulency of the gases during the suction and compression strokes in spite of the upper arrangement of the valves. As the greatest part of the surface of the compression chamber is formed by the piston and the valves, the cooling surface is comparatively small. In spite of the advantageous shape of the compression chamber for the turbulency, the distance of the sparking plug from any point of the compression chamber is a small one. It is possible to fill the space of the compression chamber more or less by an extension 10 of the piston, so that practically no limits are set to the reduction of the volume of the compression chamber, the turbulency being increased at the same time. As the compression chamber is an extension of the cylinder bore the former will be polished at the same time with the latter. The greatest part of the flat cylinder bottom is occupied by the valve, while the remaining part thereof can be polished without complications. The highly polished surface of the compression chamber is, however, very advantageous from the point of view of the heat losses. Great water spaces, completely surrounding the spark plugs, are due to the peculiar arrangement of the valves without injurious accumulation of material in the walls.

The valve gear is comparatively simple. According to Fig. 1 the exhaust valve 7 is controlled from the lower cam shaft 11 by means of the plunger 22 and of a bell crank lever 23 pivoted on shaft 12, while the inlet valve 4 is operated from the same cam shaft by the intermediary of the longer plunger 13 and the lever 15 journalled on shaft 14 mounted on the cylinder cover 5.

Figure 2:
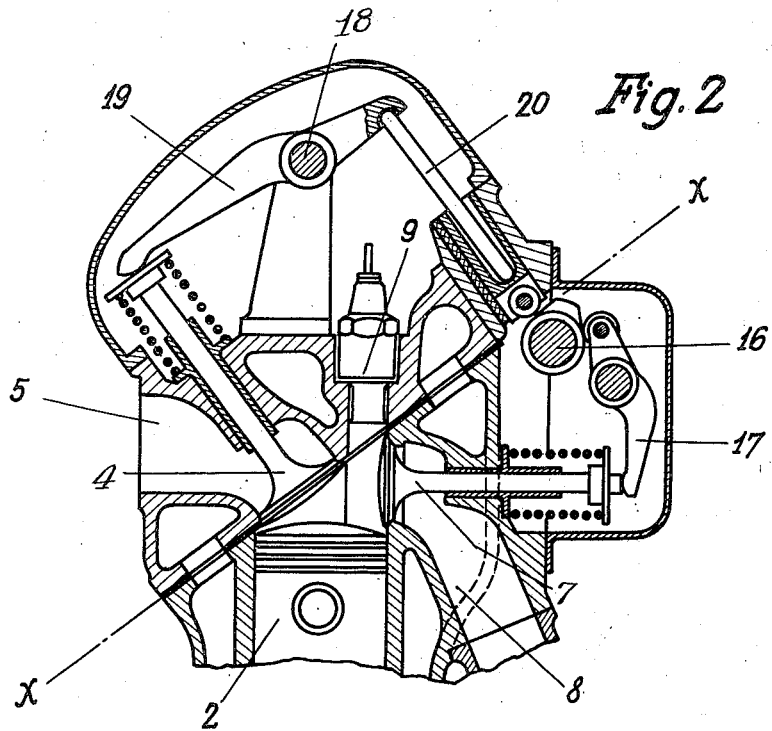
Fig. 2 is a modified form of the valve gear with upper cam shaft common to the inlet and exhaust valves.

The arrangement according to Fig. 2 corresponds substantially to that one shown in Fig. 1, with the difference, however, that the seat of the inlet valve is exactly level with the cylinder bottom of the plane of division $x-x$. A common cam shaft 16 mounted on the cylinder operates the exhaust valve 7 directly by means of lever 17 and the inlet valve 4 through intermediary of a plunger 20 by means of lever 19 pivoted at 18 on the cylinder cover.

Figure 3:
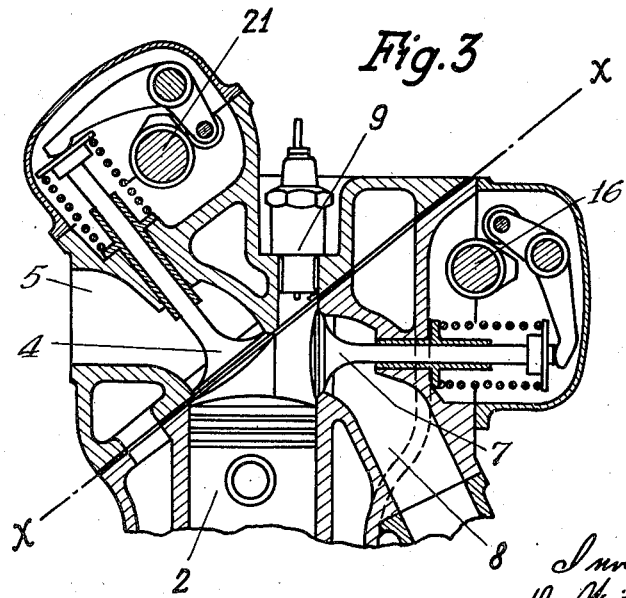
Fig. 3 shows a valve gear with separate upper cam shaft for the inlet and exhaust valves.

According to Fig. 3 separate cam shafts 16 and 21 are provided for the exhaust valve 7 and the inlet valve 4 respectively.

What we claim is:

In an internal combustion engine a flat cylinder bottom separated from the cylinder according to a plane forming an acute angle with the cylinder axis, an inlet valve located in said cylinder bottom with its stem at an acute angle with respect to the cylinder axis, an exhaust valve located in the wall of a cylindrical extension of the cylinder along the longitudinal axis thereof forming the compression chamber with its stem substantially perpendicular to the axis of the cylinder.

OTTO WITTENBERG.
EUGENE HARSANYI.